United States Patent
Schwarz

(10) Patent No.: US 7,857,257 B2
(45) Date of Patent: Dec. 28, 2010

(54) AIRCRAFT THERMAL MANAGEMENT SYSTEM WITH REDUCED EXHAUST RE-INGESTION

(75) Inventor: Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1153 days.

(21) Appl. No.: 11/515,020

(22) Filed: Sep. 1, 2006

(65) Prior Publication Data

US 2008/0053101 A1    Mar. 6, 2008

(51) Int. Cl.
    B64D 33/02    (2006.01)
(52) U.S. Cl. .................................. 244/53 B
(58) Field of Classification Search ............ 244/12.3, 244/12.5, 13, 23 B, 23 D, 53 R, 53 B, 58, 244/118.5, 129.4, 129.5, 207–209; 137/15.1, 137/15.2
    See application file for complete search history.

(56) References Cited

U.S. PATENT DOCUMENTS

| | | | |
|---|---|---|---|
| 5,275,356 A | | 1/1994 | Bollinger et al. |
| 5,655,359 A | * | 8/1997 | Campbell et al. ............. 60/772 |
| 5,743,493 A | * | 4/1998 | McCaughan ................. 244/130 |
| 5,772,156 A | * | 6/1998 | Parikh et al. ................. 244/209 |
| 5,884,873 A | * | 3/1999 | Breit .......................... 244/209 |
| 6,092,360 A | * | 7/2000 | Hoag et al. ................... 60/783 |
| 6,270,037 B1 | * | 8/2001 | Freese et al. ................ 244/12.3 |
| 6,349,899 B1 | | 2/2002 | Ralston |
| 2008/0179466 A1 | * | 7/2008 | Campbell et al. ......... 244/53 B |

* cited by examiner

Primary Examiner—Timothy D Collins
Assistant Examiner—Valentina Xavier
(74) Attorney, Agent, or Firm—Carlson, Gaskey & Olds PC

(57) ABSTRACT

A thermal management system includes a cooling duct system that locates a ram air intake and an exhaust through a first aircraft surface above a second aircraft surface which locates a fan intake. During ground operations, an anti-re-ingestion door is open and a ram air door is closed such that the fan system may draw relatively cooler air from below the aircraft and exhaust the heated air above the aircraft to minimize re-ingestion of the heated exhaust. During flight operations, the anti-re-ingestion door is closed and the ram air door is open such that ram airflow communicates through the fan system prior to communication through the heat exchanger. Both the anti-re-ingestion door and the ram air door may also be operated in flight.

29 Claims, 4 Drawing Sheets

AIRCRAFT THERMAL MANAGEMENT SYSTEM WITH REDUCED EXHAUST RE-INGESTION

BACKGROUND OF THE INVENTION

The present invention relates to a thermal management system for an aircraft gas turbine engine, and more particularly to a heat exchanger cooling duct system that reduces system pressure drop and resists re-ingestion of heated airflow from the heat exchanger during aircraft ground operations.

Aircraft thermal management systems are utilized to cool various components and systems including for example the engine oil system, avionics systems and mechanical components. Tactical aircraft in particular place a premium on space such that systems that require cooling airflow are often packaged within the airframe in a manner which complicates effective thermal management thereof. Such aircraft are required to operate in airport environments which further complicate effective thermal management such as high altitude and hot ambient temperature environments. Still other operational conditions such as where a multitude of aircraft are stacked up on taxiways awaiting take-off in the mid-day sun still further complicates effective thermal management by raising the effective ambient temperature at a time when the aircraft can not be cooled by ingesting air provided by a ram scoop and the vehicle's forward velocity.

Aircraft thermal management systems often include a duct system through which a portion of the air stream is diverted to communicate airflow (e.g. ram air) over a fuel-air heat exchanger. During various operations such as ground operations, this ram air may be supplanted by a fan system which communicates airflow over the heat exchanger. Conventional ducting and door arrangements often result in leakage and pressure losses in either or both operational conditions.

Ground idle operations are one of the most extreme thermal management "corner point" conditions encountered by aircraft. Taxiways are typically in the opposite direction of into-the-wind runways such that tailwinds bearing the hot engine exhaust tend to dominate ground operations. Various conventional thermal management systems often closely locate an exhaust aft of an intake on an aircraft upper surface. This intake and exhaust arrangement may result in the fan system re-ingesting heated exhaust air at close to 100% of the system's discharge temperature. Thermal management may then be further complicated by the re-ingestion of exhausted air from the heat exchanger itself which has been further heated by solar loads as the air flows through the boundary layer on the aircraft upper surfaces. In the case of fuel-air heat exchangers, still other operational conditions, such as low fuel tank levels, may further complicate thermal management because the fuel in the tank starts to heat up as warm, poorly cooled fuel is returned to the tank and mixes in with the balance of the fuel. Various combinations of these adverse conditions may cause fuel tank temperatures to rise relatively quickly and surpass a limiting temperature such as the fuel tank seal allowable limits in the case of fuel systems, and bearing compartment lubrication temperature limits in the case of oil systems, and chemical degradation limits in the case of hydraulic systems.

Accordingly, it is desirable to provide a thermal management cooling duct system which minimizes leakage and pressure losses yet enhances cooling airflow by resistance to self-re-ingestion of heated airflow from the heat exchanger during aircraft ground-idle operations, as well as reducing the cooling system's thermal vulnerability to solar heating.

SUMMARY OF THE INVENTION

The thermal management system according to the present invention includes a cooling duct system that generally includes a plenum, a ram air intake, a fan intake and an exhaust. The ram air intake is in communication with the plenum through a ram air duct, the fan intake is in communication with the plenum through a fan duct, and the exhaust is in communication with the plenum through an exhaust duct. The ram air intake and the exhaust are located through a first aircraft surface and the fan intake is located through a second aircraft surface different than the first aircraft surface.

A heat exchanger is located within the plenum adjacent the exhaust and a fan system is co-located with the heat exchanger. The fan system communicates with the ram air duct and the fan duct such that airflow therefrom is communicated through the fan system prior to communication through the heat exchanger.

An anti-re-ingestion door is movable between an open position to permit fan airflow through the fan intake and a closed position to block fan airflow from the fan intake. The anti-re-ingestion door preferably opens in an outward direction away from a screen in the fan duct located there to minimize Foreign Object Damage (FOD) as well as further minimize re-ingestion of heated exhaust airflow being released in an area above the door. A ram air door is movable between an open position to permit ram air through the ram air intake and the closed position to seal the plenum from the ram air intake. A blow in-door in communication with the plenum permits still further airflow into the plenum when sufficient ram air flow is available due to the aircraft's forward movement.

During ground operations, the anti-re-ingestion door is open, and the ram air door is closed such that the fan system may be utilized to draw relatively cooler air from below the aircraft and exhaust the heated air from the heat exchanger through the exhaust above the aircraft. Airflow re-ingestion is therefore significantly unlikely. During flight operations, the anti-re-ingestion door is closed and the ram air door is open to provide ram airflow through the fan system prior to communication through the heat exchanger. Both the anti-re-ingestion door and the ram air door may be operated together in flight or during conditions specific to a VTOL-type aircraft such as low speed or hovering flight operations.

The present invention therefore provides a thermal management cooling duct system which minimizes leakage and pressure losses yet enhances cooling airflow by resistance to re-ingestion of heated airflow from the heat exchanger during aircraft ground-idle operations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
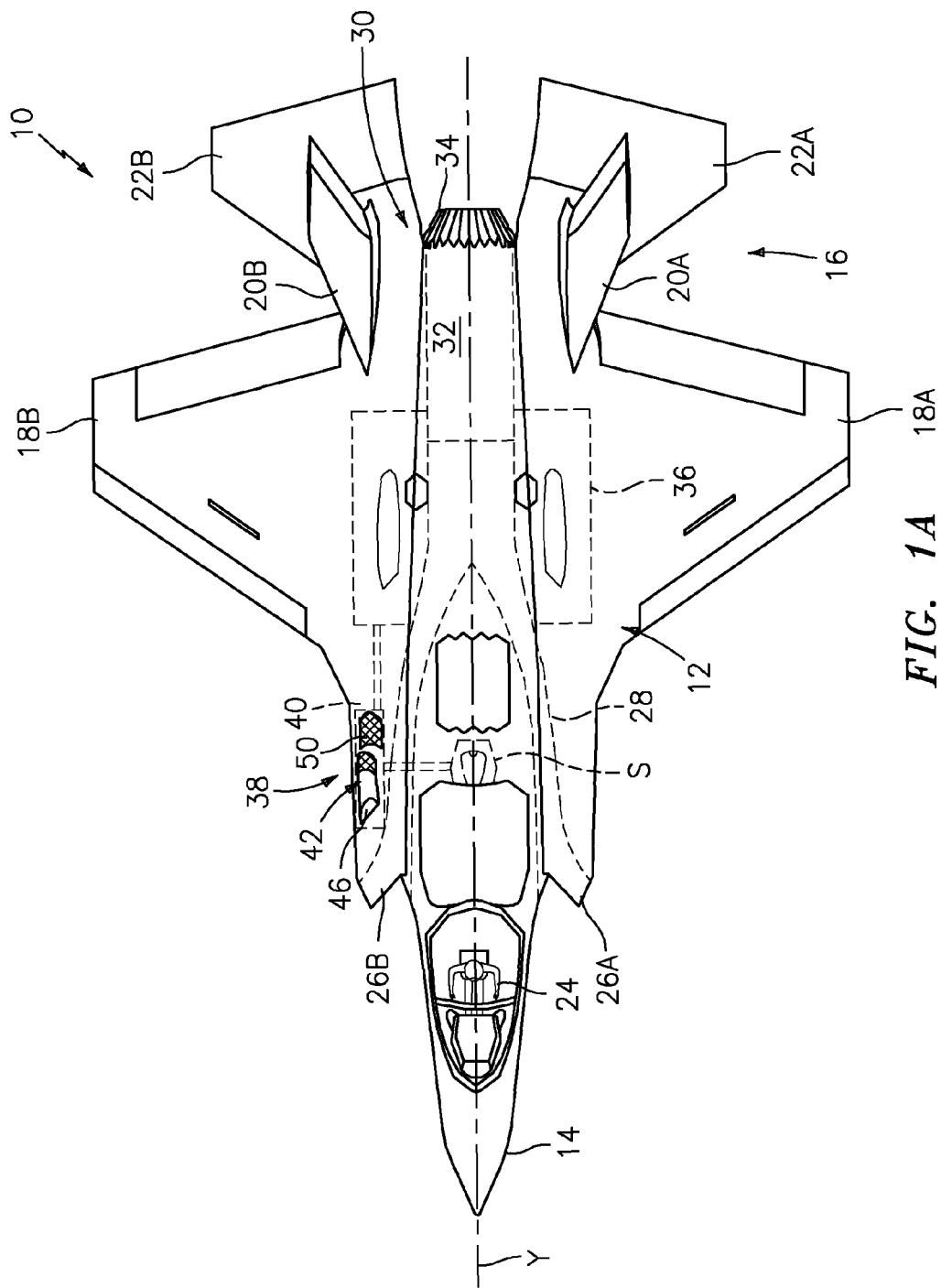
FIG. 1A is a general top perspective partial phantom view of an exemplary aircraft embodiment for use with the present invention.

FIG. 1A illustrates an exemplary aircraft 10 which defines a longitudinal axis Y. The aircraft 10 includes an airframe 12 with a nose section 14, a tail section 16, wings 18A and 18B, vertical stabilizers 20A, 20B, and horizontal stabilizers 22A and 22B. Other features include a cockpit 24, engine inlets 26A and 26B which join to form an engine inlet duct 28. Although a particular aircraft configuration is illustrated in the disclosed embodiment, other aircraft types will also benefit from the present invention.

A propulsion system 30 generally includes a turbofan engine 32 in communication with duct 28. The engine 32 includes an exhaust nozzle section 34 generally between the horizontal stabilizers 22A, 22B. A fuel system 36 communicates with the propulsion system 30.

A thermal management system 38 includes a multitude of heat exchangers 40 (only one shown) in communication with the fuel system 36. The heat exchanger 40 facilitates the rejection of thermal loads from a multitude of aircraft systems S (only one illustrated schematically) to the fuel in the fuel system 36. It should be understood that although a liquid-to-air heat exchanger which utilizes fuel as the liquid medium is disclosed in the illustrated embodiment, other heat exchanges including air-to-air heat exchangers as well as liquid-to-air heat exchangers using liquids other than fuel may also be utilized with the present invention.

Figure 2:
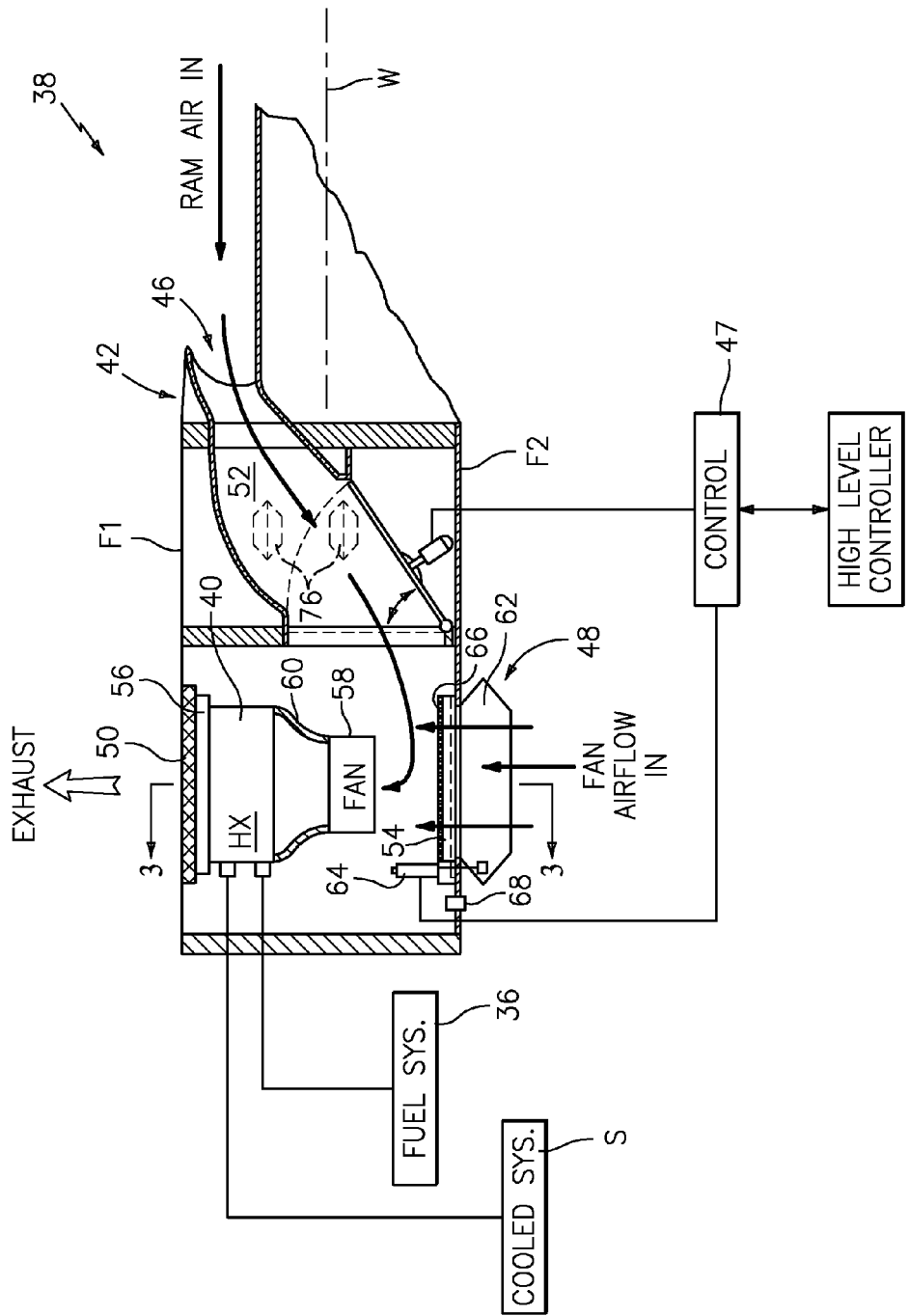
FIG. 2 is a schematic longitudinal sectional view of a cooling duct system according to the present invention.

Referring to FIG. 2, the thermal management system 38 includes a cooling duct system 42 that generally includes a plenum 44, a ram air intake 46, a fan intake 48 and an exhaust 50. The ram air intake 46 is in communication with the plenum 44 through a ram air duct 52, the fan intake 48 is in communication with the plenum 44 through a fan duct 54, and the exhaust 50 is in communication with the plenum 44 through an exhaust duct 56. The ram air duct 52 is generally transverse to the plenum 44, such that a generally T-shape or L-shape cooling duct system 42 is provided. It should be understood that other cooling duct paths in other aircraft locations will also be usable with the present invention.

Figure 1B:
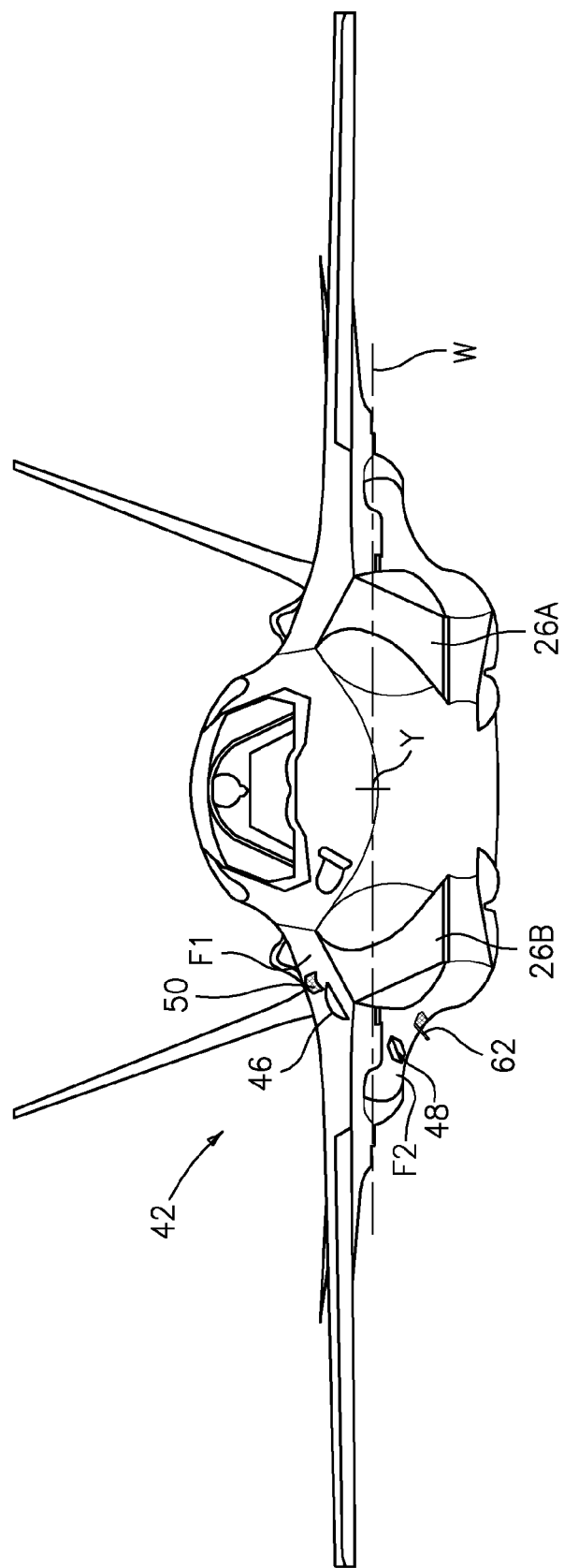
FIG. 1B is a general front perspective view of an exemplary aircraft embodiment for use with the present invention.

The ram air intake 46 and the exhaust 50 are preferably located through a first aircraft surface F1 of the aircraft. It should be understood that the ram air intake 46 may be located on a different surface than the exhaust 50. The fan intake 48 is preferably located through a second aircraft surface F2 of the aircraft different than the first surface F1 (also illustrated in FIG. 1B). The aircraft surfaces F1, F2 may be any surface of the aircraft including aircraft strakes, aerodynamic surfaces, fuselage surfaces, nacelle surfaces, pylons, and such like. Most preferably, the fan intake 48 is located below the exhaust 50 and most preferably, the fan intake 48 is located below an aircraft waterline W transverse to the aircraft longitudinal axis Y (FIGS. 1A and 1B) while the exhaust 50 is located above the waterline W (also illustrated in FIG. 2).

The heat exchanger 40 is located within the plenum 44 adjacent the exhaust 50. A fan system 58 is co-located with the heat exchanger 40 and may optionally be coupled directly thereto through a housing 60 or the like. The fan system 58 communicates with the ram air duct 52 and the fan duct 54 such that airflow therefrom is preferably communicated through the fan system 58 prior to communication through the heat exchanger 40.

Figure 3:
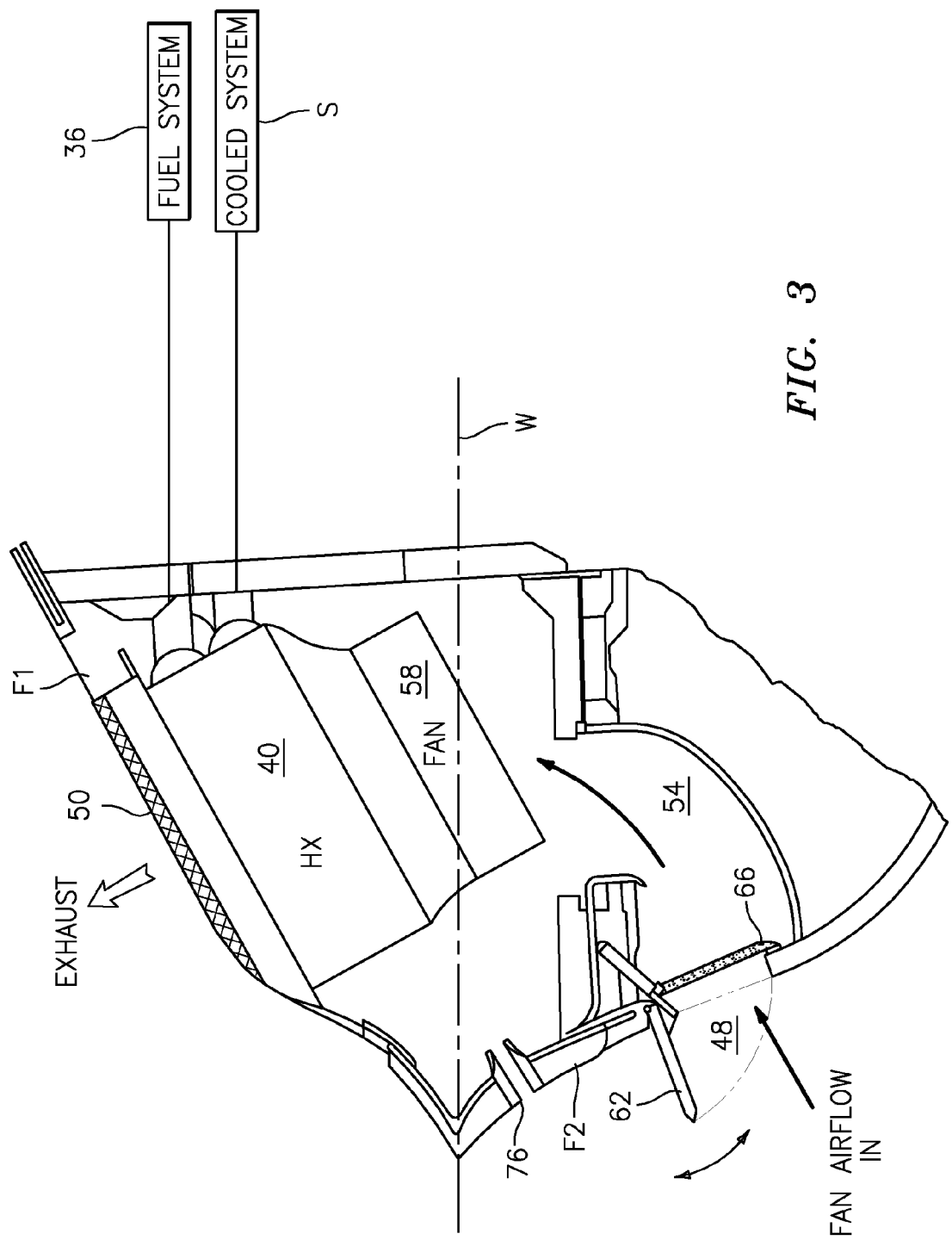
FIG. 3 is a schematic sectional view of the cooling duct system taken along the line 3-3 in FIG. 2.

An anti-re-ingestion door 62 (also illustrated in FIG. 3) is in communication with the fan duct 54. The anti-re-ingestion door 62 preferably is of a faceted geometry for a stealthy aircraft to 48 reduce radar reflection caused by the surface when closed. The anti-re-ingestion door 62 is actuatable by anti-re-ingestion door actuator 64 to move the anti-re-ingestion door 62 between an open position (shown) and a closed position (shown in phantom). The anti-re-ingestion door 62 is movable between the open position to permit fan airflow through the fan intake 48 and the closed position to block fan airflow from the fan intake 48.

The anti-re-ingestion door 62 preferably opens in an outward direction (best shown in FIG. 1B) away from a screen 66 to minimize Foreign Object Damage (FOD) as well as minimize re-ingestion of heated exhaust from the exhaust 50. A FOD screen 66 and rain drain 68 are likewise located within the plenum 44. The FOD screen 66 further minimizes FOD and the rain drain 68 permits evacuation of the plenum 44.

A ram air door 70 is located in communication with the ram air duct 52. The ram air door 70 is preferably located adjacent the plenum 44, however, other locations will likewise be usable. Alternatively, or in addition thereto, a ram air intake door may be located adjacent the ram air intake 46 to provide a continuous smooth surface contiguous with the first aircraft surface F1 when closed. The ram air door 70 is actuatable by a ram air door actuator 72 to move the ram air door 70 between an open position and a closed position (shown in phantom). The ram air door 70 is movable between the open position to communicate ram air into the plenum 44 and the closed position to block ram airflow through the ram air duct 52 from the ram air intake 46 and preferably seal the plenum 44.

A controller 74 (illustrated schematically) communicates with the anti-re-ingestion door actuator 64 and the ram air door actuator 72 to selectively operate each in response to cooling requirements and operating conditions. The controller 47 may further be in communication with a higher level controller such as a flight control computer and/or engine management system control.

During ground operations, the anti-re-ingestion door 62 is open, and the ram air door 70 is closed such that the fan system 58 may be utilized to draw relatively cooler air from below the aircraft and exhaust the heated air from the heat exchanger 40 through the exhaust above the aircraft. Re-ingestion of the heated exhaust is therefore significantly unlikely. During flight operations, the anti-re-ingestion door 62 is closed and the ram air door 70 is open to provide ram airflow from the ram intake 46, through the ram duct 52, the fan system 58 and through the heat exchanger 40 where it is then exhausted from the exhaust 50. Notably, the ram airflow preferably communicates through the fan system 58 prior to communication through the heat exchanger 40. Although the ram intake 46 provides significant pressure, it may be desirable to provide additional airflow area during the ram portion of the flight if the ram pressure is low. Both the anti-re-ingestion door 62 and the ram air door 70 may both be operated in flight or during conditions specific to a VTOL-type aircraft such as low speed or hovering flight operations. Furthermore, the blow-in door 76 selectively permits still further airflow through the heat exchanger 40 to supplement airflow and minimize the potential for pressure drop during some operational conditions such as when the ram intake 46 may be masked.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An aircraft cooling air duct system comprising:
   a plenum;
   a ram air intake in communication with said plenum;
   a fan intake in communication with said plenum; and
   an exhaust in communication with said plenum, said exhaust at least partially above said fan intake and transverse to said ram air intake such that a fan airflow direction from said fan intake through said exhaust is generally transverse to a ram air in direction from said ram air intake.

2. The system as recited in claim 1, wherein said fan intake is below an aircraft waterline and said exhaust is above said aircraft waterline.

3. The system as recited in claim 1, wherein said fan intake communicates through a first surface and said exhaust communicates through a second surface different than said first surface.

4. The system as recited in claim 1, further comprising an anti-re-ingestion door movable between an open position to permit fan airflow through said fan intake to said plenum and a closed position to block said fan airflow from said fan intake to said plenum.

5. The system as recited in claim 4, wherein said anti-re-ingestion door is faceted.

6. The system as recited in claim 4, wherein said anti-re-ingestion opens outward relative said fan intake.

7. The system as recited in claim 1, further comprising a FOD screen within said fan intake.

8. The system as recited in claim 1, further comprising a blow-in door in communication with said plenum.

9. The system as recited in claim 1, further comprising a ram air door movable between an open position which permits ram airflow from said ram air intake to said plenum and a closed position which prevents said ram airflow from said ram air intake to said plenum.

10. The system as recited in claim 9, further comprising an anti-re-ingestion door movable between an open position to permit fan airflow through said fan intake to said plenum and a closed position to block said fan airflow from said fan intake to said plenum.

11. An aircraft thermal management system comprising:
    a heat exchanger;
    a fan system in communication with said heat exchanger;
    a ram air intake in communication with said heat exchanger through said fan system;
    a fan intake in communication with said heat exchanger through said fan system; and
    an exhaust in communication with said heat exchanger, said exhaust at least partially above said fan intake and transverse to said ram air intake such that a fan airflow direction from said fan intake through said exhaust is generally transverse to a ram air in direction from said ram air intake.

12. The system as recited in claim 11, wherein said fan intake is below an aircraft waterline and said exhaust is above said aircraft waterline.

13. The system as recited in claim 11, wherein said fan intake communicates through a first aircraft surface and said exhaust communicates through a second aircraft surface different than said first aircraft surface.

14. The system as recited in claim 11, wherein said heat exchanger is a liquid-to-air heat exchanger.

15. The system as recited in claim 14, wherein said liquid-to-air heat exchanger is in fluid communication with a fuel system.

16. The system as recited in claim 11, further comprising:
    a ram air door movable between an open position which permits ram airflow from said ram air intake to said plenum and a closed position to block said ram airflow from said ram air intake to said plenum; and
    an anti-re-ingestion door movable between an open position to permit fan airflow through said fan intake to said plenum and a closed position to block said fan airflow from said fan intake to said plenum.

17. The system as recited in claim 16, further comprising a blow-in door in communication with said plenum.

18. The system as recited in claim 11, wherein said fan system is directly coupled to said heat exchanger within a common plenum.

19. A method of thermal management comprising the steps of:
    (A) communicating airflow through a RAM air intake to plenum;
    (B) communicating airflow through a fan intake to the plenum; and
    (C) exhausting the airflow through an exhaust located at least partially above the fan intake transverse to the ram air intake such that a fan airflow direction from said fan intake through said exhaust is generally transverse to a ram air in direction from said ram air intake.

20. The method of thermal management as recited in claim 19, wherein said step (A) comprises the steps of:
    (a) opening an anti-re-ingestion door to permit fan airflow through a fan intake.

21. The method of thermal management as recited in claim 19, wherein said step (A) comprises the steps of:
    (a) opening a ram air door to permit ram airflow through the ram air intake.

22. The method of thermal management as recited in claim 19, wherein said step (A) comprises the steps of:
    (a) opening an anti-re-ingestion door to permit fan airflow through a fan intake; and
    (b) opening a ram air door to permit ram airflow through the ram air intake.

23. The system as recited in claim 1, wherein said fan intake communicates through a lower fuselage surface and said exhaust communicates through an upper fuselage surface different than said lower fuselage surface.

24. The system as recited in claim 1, further comprising a fan system downstream of said ram air intake and said fan intake.

25. The system as recited in claim 24, further comprising a heat exchanger downstream of said fan system and upstream of said exhaust.

26. The system as recited in claim 25, further comprising a housing which mounts said heat exchanger and said fan system within said plenum.

27. The system as recited in claim 1, further comprising a fan system within said plenum to direct said fan airflow direction from said fan intake through said exhaust.

28. The system as recited in claim 1, wherein said fan intake is in communication with said plenum through a ram air duct generally transverse to said plenum, said ram air duct and said plenum forms a generally T-shape cooling duct system.

29. The system as recited in claim 1, wherein said fan intake is in communication with said plenum through a ram air duct generally transverse to said plenum, said ram air duct and said plenum forms a generally L-shape cooling duct system.

* * * * *